Figure 1:
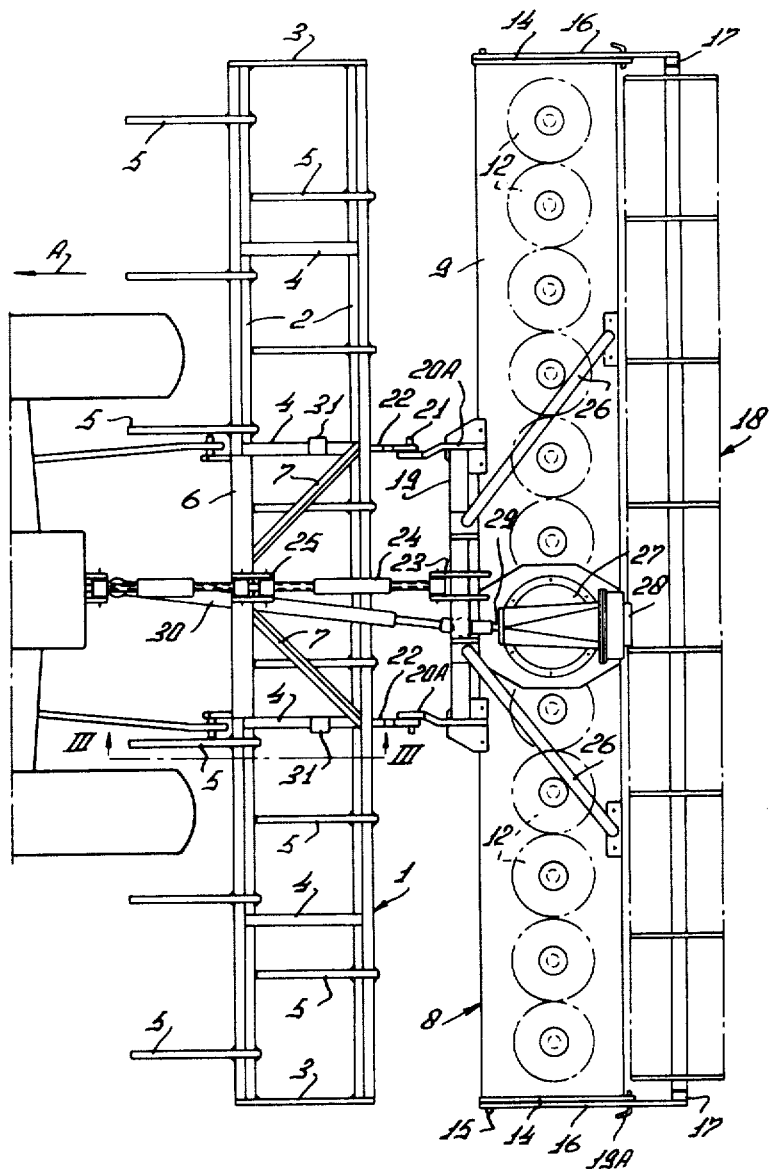

United States Patent [19]

van der Lely

[11] 3,937,460

[45] Feb. 10, 1976

[54] COMBINATIONS OF TWO SOIL CULTIVATING IMPLEMENTS

[76] Inventor: Cornelis van der Lely, 7, Bruschenrain, Zug, Switzerland

[22] Filed: Apr. 24, 1974

[21] Appl. No.: 463,590

[30] Foreign Application Priority Data

May 1, 1973 Netherlands............... 7306002

[52] U.S. Cl. .................... 172/59; 172/70; 172/439
[51] Int. Cl.² ........................................ A01B 33/00
[58] Field of Search ............ 172/63, 64, 68, 71, 73, 172/59, 439, 111

[56] References Cited
UNITED STATES PATENTS

| 1,959,942 | 5/1934 | Avignon.......................... 172/59 X |
| 3,638,539 | 2/1972 | Lewis............................... 172/59 X |
| 3,667,551 | 6/1972 | van der Lely et al............... 172/59 |
| 3,810,434 | 5/1974 | van der Lely et al............... 172/59 X |

FOREIGN PATENTS OR APPLICATIONS

| 1,215,148 | 4/1960 | France................................. 172/59 |

Primary Examiner—Stephen C. Pellegrino
Attorney, Agent, or Firm—Mason, Mason & Albright

[57] ABSTRACT

Two cultivators, in combination, form an assembly with a first implement having fixed soil penetrating members and a second cultivator has rotatary soil working members with tines that intensely work the soil broken by the first cultivator. Each cultivator has a corresponding coupling member at the forward portion of its frame and each coupling member is connectable to the lifting hitch of a conventional tractor independently of the other implement. Alternatively, the coupling members can be interlinked to one another with pivotable arms so that each cultivator is independently movable with respect to one another for a limited extent in vertical directions. A supporting roller can be positioned to the rear of the second cultivator.

13 Claims, 3 Drawing Figures

COMBINATIONS OF TWO SOIL CULTIVATING IMPLEMENTS

This invention relates to combinations of two soil cultivating implements.

In most known combinations of two soil cultivating implements, those implements are restricted to use in the combination and cannot be employed individually. Moreover, the use of a mould-board or disc plough is nearly always necessary before employing such known combinations if a soil consistency suitable for use as a seed bed is to be obtained without still further cultivating work. The present invention seeks to overcome, or at least reduce, these disadvantages of known soil cultivating implement combinations.

According to one aspect of the invention, there is provided a combination of two soil cultivating implements, wherein each implement has a frame with a coupling member by which it can be operatively connected to a tractor or other vehicle independently of the other implement of the combination, and wherein one implement is a cultivator having soil working tines whose positions are substantially fixed relative to its frame, and the other implement is a rotary harrow comprising at least one tined soil working member or rotor arranged to revolve about a vertical or substantially vertical axis during operation.

Figure 2:
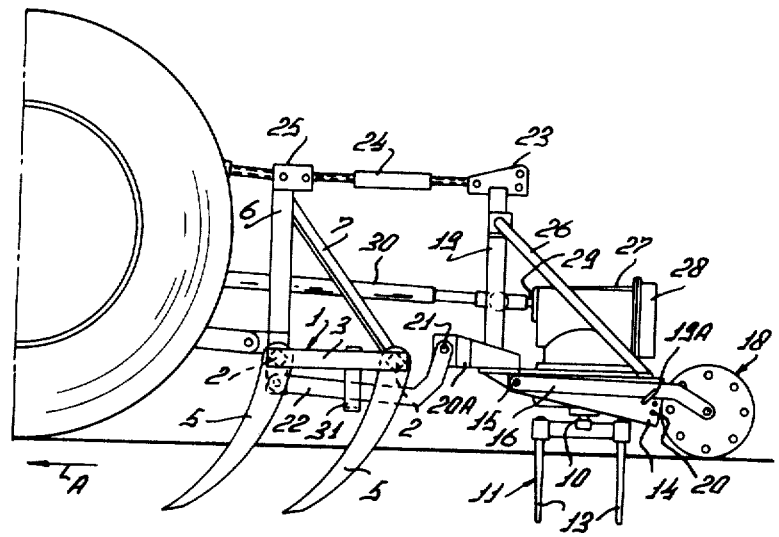
Figure 3:
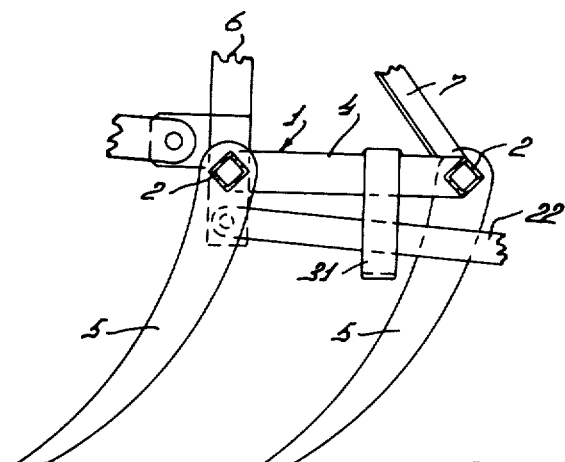

For a better understanding of the invention, and to show how the same may be carried into effect, reference will now be made, by way of example, to the accompanying drawings, in which:

FIG. 1 is a plan view of a combination in accordance with the invention of two soil cultivating implements connected to the rear of an agricultural tractor, FIG. 2 is a side elevation of the combination of FIG. 1, and FIG. 3 is a section, to an enlarged scale, taken on the line III—III in FIG. 1.

Referring to the accompanying drawings, the combination of two soil cultivating implements which is illustrated comprises, at the front with respect to the intended direction of operative travel of the combination which is indicated by an arrow A in FIGS. 1 and 2 of the drawings, a cultivator 1. The cultivator 1 has a frame which comprises two beams 2 that extend substantially horizontally parallel to one another in spaced apart relationship in the direction A, both beams being transverse to the direction which has just been mentioned and normally substantially perpendicular thereto. The two frame beams 2 are both of hollow formation and have a polygonal cross-section which, it is preferred, should be square (see FIG. 3). With this preferred construction, the two beams 2 are both disposed in such a way that, as seen in cross-section (FIG. 3), one diagonal between opposite corners of each beam extends substantially vertically while a perpendicular diagonal between the other two corners thereof extends substantially horizontally. The opposite lateral ends of the front and rear frame beams 2 are interconnected by substantially vertically disposed strips 3 that extend substantially parallel to the direction A. The two beams 2 are further interconnected, at regular intervals between the two strips 3, by supports 4, of which there may be four, said supports 4 also extending substantially horizontally parallel to one another and to the direction A.

Each of the frame beams 2 is provided with a corresponding row of regularly spaced apart soil working tines 5 which tines are rigidly secured to the beams 2. The tines 5 of the two rows are staggered laterally across the cultivator in such a way that, when the cultivator 1 is viewed from the rear in the direction A, the tines 5 of the two rows are seen to lie alternately between each other in regularly spaced apart relationship. Each rigid tine 5 extends downwardly from its point of connection to the corresponding frame beam 2 and is arcuately curved forwardly with respect to the direction A in such a way that a point formed at its lowermost and foremost end with respect to said direction is orientated forwardly. As can be seen in FIGS. 2 and 3 of the drawings, each regularly curved tine tapers gently from its uppermost root to its lowermost pointed tip and is thus of progressively narrowing width considered from root to tip.

A substantially central region of the leading frame beam 2 with respect to the direction A is provided with a coupling member or trestle 6 of generally triangular configuration constructed and arranged for connection to the three-point lifting device or hitch of an agricultural tractor or other operating vehicle in the manner which can be seen in outline in FIGS. 1 and 2 of the drawings. Strengthening bars 7 that diverge downwardly, and rearwardly with respect to the direction A, from the top of the coupling member or trestle 6 have their lowermost and rearmost ends rigidly secured to the top of the rear frame beam 2 at locations spaced to opposite sides of the center of that beam. The second soil cultivating implement of the combination is a rotary harrow 8 that is located behind the cultivator 1 with respect to the direction A. The rotary harrow 8 has a hollow box-shaped frame portion 9 that extends substantially horizontally transverse, and normally substantially perpendicular, to the direction A in which frame portion a plurality, such as 12, of vertical or substantially vertical shafts 10 are rotatably mounted in a single row in regularly spaced apart relationship. The lowermost ends of the shafts 10 that project from beneath the frame portion 9 carry corresponding tined soil working members or rotors 11. The rotary shafts 10 are spaced apart from one another by distances which it is preferred should be substantially 25 centimeters and each of them is provided, inside the hollow frame portion 9, with a corresponding straight- or spur-toothed pinion 12, the teeth of each pinion 12 being in mesh with those of the or each of its neighbours in the manner which is indicated in outline in FIG. 1 of the drawings. Each of the soil working members or rotors 11 comprises a substantially horizontally disposed support rigidly secured by its center to the lowermost end of the corresponding shaft 10, said support being provided with substantially vertically disposed sleeve-like tine holders at its opposite ends in which holders fastening portions of rigid soil working tines 13 are received, active or soil working portions of said tines 13 extending downwardly beneath the holders and into the soil during operation, as illustrated in FIG. 2 of the drawings.

The opposite lateral sides or ends of the frame portion 9 carry vertically disposed and substantially sector-shaped plates 14 and arms 16 are turnable upwardly and downwardly alongside the plates 14 about the common substantially horizontal axis of pivots 15 located at the top and front of the plates 14 with respect to the direction A, said common substantially horizontal axis that has just been mentioned being transverse, and normally substantially perpendicular, to the direction A. The arms 16 extend rearwardly from the pivots 15 with respect to the direction A and a supporting member in the form of a ground roller 18 is rotatably mounted in bearings 17 carried at the downwardly inclined rearmost ends of the arms 16. The axis of rotation of the ground roller 18 extends parallel or substantially parallel to a substantially horizontal line joining the axes of rotation of all of the shafts 10 and thus transverse, and normally substantially perpendicular, to the direction A. Curved rows of holes 20 are formed alongside the rearmost edges of the plates 14 with respect to the direction A, all of said holes 20 being equidistant from the common substantially horizontal axis defined by the pivots 15. The arms 16 are formed with single holes that are located at the same distance from the axis which has just been mentioned and horizontal locking pins 19A are provided for entry through the holes in the arms 16 and chosen holes 20 to maintain the arms 6, and thus the ground roller 18, in a corresponding angular setting about the common substantially horizontal axis defined by the pivots 15. It will be apparent from FIG. 2 of the drawings that the setting which is chosen is a principal factor in controlling the depth of penetration of the tines 13 into the soil during operation.

The front of the frame portion 9 of the rotary harrow 8 with respect to the direction A is provided, substantially centrally across its width, with a coupling member of trestle 19 whose foot comprises two upright plates 20A that are horizontally spaced apart from one another in a direction transverse, and normally substantially perpendicular, to the direction A. The relatively remote surfaces of the two plates 20A carry horizontally aligned pins 21 and the apex of the coupling member or trestle 19, which is of generally triangular configuration, carries two parallel and vertically disposed coupling plates 23 that are spaced apart from another in the same direction as the plates 20A by a much shorter distance. It will be apparent that the coupling member or trestle 19 is constructed and arranged to enable it to be connected directly to the three-point lifting device or hitch of an operating tractor or other vehicle but, when the rotary harrow 8 is used as part of the combination which is being described, the pins 21 are pivotally engaged with the uppermost and rearmost ends of arms 22 whose leading ends are pivotally coupled to substantially horizontally aligned pins at the foot of the coupling member of trestle 6 of the cultivator 1 (see FIG. 2 of the drawings). An arm 24 whose length is adjustable has its leading end pivotally mounted between coupling plates 25 at the apex of the coupling member or trestle 6 and its rearmost end pivotally mounted between the fronts of the two coupling plates 23 at the apex of the coupling member or trestle 19. The pivotable arms 22 and 24 allow the rotary harrow 8 to move upwardly and downwardly independently of the cultivator 1 without any significant tilting since, as seen in side elevation (FIG. 2), they establish a parallelogram linkage between the coupling member or trestle 6 and the coupling member or trestle 19. As previously mentioned, the arm 24 can be adjusted in length as may be required, such adjustment being known per se.

Locations near the apex of the coupling member or trestle 19 are connected by downwardly and rearwardly, with respect to the direction A, divergent strengthening bars 26 to locations at the top and rear of the frame portion 9 that are spaced apart from one another laterally of the intended direction of operative travel A. One of the center pair of shafts 10 has an upward extension into a gear box 27 that is mounted on top of the frame portion 9. The shaft extension in question is in driven connection with a forwardly projecting rotary input shaft 29 of the gear box 27 by way of bevel pinions (not visible) contained within the gear box 27 and by way of a change-speed gear 28 mounted at the rear of the gear box 27. It is not necessary to describe the construction and operation of the change-speed gear 28 in detail but, briefly, it is furnished with interchangeable and/or exchangeable toothed pinions and will give different transmission ratios between rotary shafts in the gear box 27 in dependence upon the particular pinion arrangement that is selected. Thus, various speeds of rotation of the soil working members or rotors 11 can be selected without changing the input speed of rotation applied to the shaft 29. The leading splined or otherwise keyed end of the rotary input shaft 29 is placed in driven connection with the power take-off shaft of the operating agricultural tractor or other vehicle by way of an intermediate telescopic transmission shaft 30 that is of a construction which is known per se having universal joints at its opposite ends. As can be seen in the drawings, the shaft 30 extends through the generally triangular coupling members or trestles 6 and 19 and over the top of the frame of the cultivator 1. The two supports 4 of the frame of the cultivator 1 that are nearest to the center thereof carry depending hook-shaped stops 31 which, as will be evident from FIG. 3 of the drawings, prevent the arms 22 turning downwardly about their pivotal connections with the foot of the coupling member or trestle 6 beyond angular settings that are limited by the blocking bottoms of said stops 31. Thus, the three-point lifting device or hitch of the agricultural tractor or other operating vehicle can be raised to bring both the implements 1 and 8 to a position suitable for inoperative transport thereof without the arms 22 and 24 turning downwardly too far about their pivotal connections with the coupling member or trestle 6.

In the use of the soil cultivating implement combination that has been described, the combination is moved over the ground in the direction A so that the rigid tines 5 of the leading cultivator tear up large lumps of soil which, subsequently, are substantially uniformly crumbled by the tines 13 of the immediately following rotary harrow 8, the soil working members or rotors 11 of said harrow 8 being rotated from the power take-off shaft of the operating tractor or other vehicle by way of the transmission which comprises the shaft 30, the shaft 29, the gear box 27, the change-speed gear 28 and the pinions 12. The ground roller 18 compresses the worked soil to some extent and breaks up any lumps of soil that may still remain. The result is a substantially flat gently compressed but well crumbled soil surface which is generally usable as a seed bed without further cultivating operations.

The combination which has been described above is particularly useful for working heavy soil that has become excessively hardened by drought conditions. The use of a plough prior to the use of the combination is not necessary and it will be noted that, since both of the implements 1 and 8 can be connected independently to the three-point lifting device or hitch of an operating agricultural tractor or other vehicle, the use of such implements is not restricted to the combination and either implement can be used entirely indepenently of the other when required. Since the cultivator 1 is located closely behind the operating tractor or other vehicle in the use of the combination, the extent of the projection of the whole combination rearwardly of said tractor or other vehicle when the three-point lifting device or hitch thereof is raised to bring the combination to an inoperative transport position is not sufficient to cause the three-point lifting device or hitch to be loaded to an excessive extent nor is the steering of the tractor or the operating vehicle adversely affected to any significant extent.

Although various features of the combination which has been described and/or that is illustrated in the accompanying drawings will be set forth in the following claims as inventive features, it is emphasised that the invention is not necessarily limited to those features and that it includes within its scope each of the parts of the combination that has been described and/or that has been illustrated in the accompanying drawings both individually and in various combinations.

What we claim is:

1. A soil-cultivating assembly comprising a combination of two cultivating implements positioned one behind the other, each of said implements having a frame and a coupling member for independent and alternative connection to one another and to a prime mover, a first implement being positioned as a leading implement and having tines rigidly fixed to a corresponding frame and a second implement having rotatable soil-working tined members that revolve about upwardly extending axes, driving means for revolving said soil-working members and said driving means being in driving engagement with a power take-off of the prime mover, the coupling members of said two implements being interconnected with a three-point lifting device of the prime mover, the front of the frame of said leading implement having its corresponding coupling member positioned for connection to the three-point lifting device of the prime mover, arm means being provided, between the rear of said coupling member and the coupling member of the said second implement for linking said respective coupling members, said arm means comprising upper arm means and lower arm means, stop means being positioned adjacent said lower arm means to limit movements of same.

2. A combination as claimed in claim 1, wherein said two implements have trestle coupling members mounted on their respective frames that are substantially similar to one another.

3. A combination as claimed in claim 1, wherein said leading implement comprises two rows of soil-working tines that are located one behind the other with respect to the direction of operative travel.

4. A combination as claimed in claim 3, wherein, when the implement is viewed from the rear in its direction of operative travel, alternate tines are located in said two rows.

5. A combination as claimed in claim 3, wherein the tines of said first implement are inclined downwardly and forwardly, with respect to the direction of operative travel, towards their tips.

6. A combination as claimed in claim 1, wherein said driving means includes a drive transmission to each soil-working member including a transmission shaft which extends over the frame of said first implement for connection to the power take-off of the prime mover.

7. A combination as claimed in claim 6, wherein a supporting member is secured to the rear of said second implement and said supporting member engages the ground.

8. A combination as claimed in claim 7, wherein said supporting member is a roller that is turnable about a horizontal axis, the said roller extending across substantially the entire working width of the combination.

9. A combination as claimed in claim 8, wherein said supporting member extends substantially parallel to a line joining the axis of rotation of said soil-working members.

10. A combination as claimed in claim 7, wherein vertically adjusting means is connected to said supporting member to change the latter's position with respect to the frame of said second cultivator.

11. A combination as claimed in claim 1, wherein the said arm means is pivotally connected to both the said coupling members.

12. A combination as claimed in claim 1, wherein said second implement is connected to the three-point lifting device of the prime mover via arms that are pivotally connected to the coupling member of said first implement, said arms extending rearwardly from that coupling member with respect to the direction of operative travel.

13. A soil cultivating assembly comprising a combination of two cultivating implements positioned one behind the other, each of said implements having a frame and a coupling member, a first implement having fixed tines on its corresponding frame and at its coupling member secured at the forward portion of that frame for direct connection to a three-point lifting device of a prime mover, the rear of that frame having means for connection to the coupling member of a second implement, the coupling members of said implements being linked to one another by an upper arm means and a lower arm means, said lower arm means extending beneath the frame of said first implement and stop means being positioned adjacent said lower arm means to limit the movements of same, said second implement having rotatable soil working members and driving means connected to said members.

* * * * *